Figure 1:
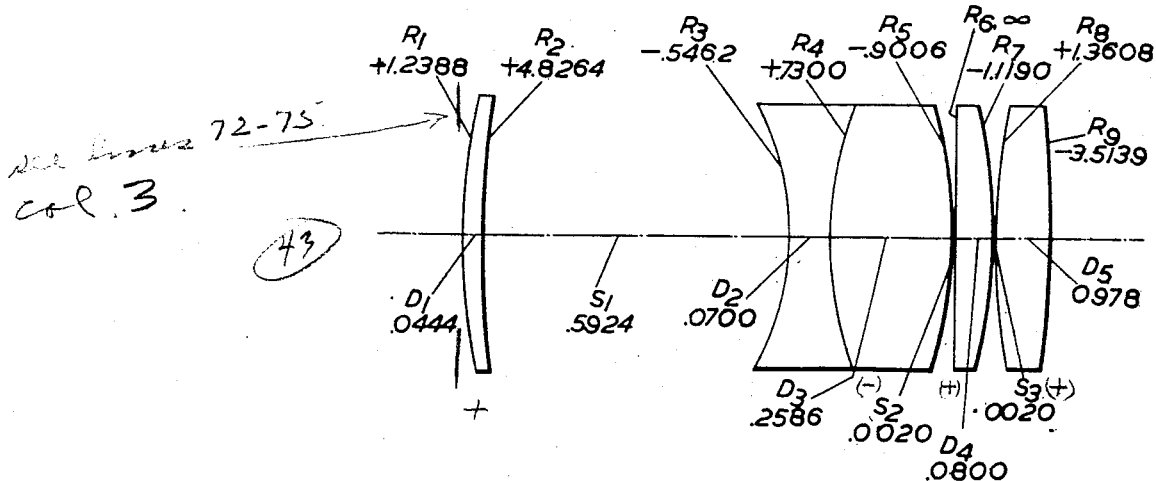

Aug. 24, 1954     K. R. COLEMAN     2,687,063

PROJECTION OPTICAL OBJECTIVE OF THE TELECENTRIC TYPE

Filed Dec. 23, 1952

Inventor
KENNETH R. COLEMAN
By
Emery Holcombe & Blair
Attorney

Patented Aug. 24, 1954

2,687,063

UNITED STATES PATENT OFFICE 2,687,063

PROJECTION OPTICAL OBJECTIVE OF THE TELECENTRIC TYPE

Kenneth Roy Coleman, Leicester, England, assignor to Taylor, Taylor & Hobson Limited, Leicester, England, a company of Great Britain Application December 23, 1952, Serial No. 327,477

Claims priority, application Great Britain January 4, 1952

30 Claims. (Cl. 88—57)

This invention relates to an optical objective corrected for spherical and chromatic aberration, coma, astigmatism and distortion, and has more particular reference (although not limited thereto) to a projection objective intended for use in the mirror-arc system of projection, wherein the objective is corrected with respect to a telecentric stop. The best known objective of this type is one having two convergent doublets separated by an air space of the order of two-thirds of the equivalent focal length of the objective. This known objective suffers from strong field curvature, the Petzval sum being of the order of five-fourths of the equivalent power of the objective, and attempts to improve the field curvature correction have usually resulted in short back focal length or bad zonal spherical aberration.

It should be made clear that the terms "front" and "rear" are herein used to refer to the sides of the objective respectively nearer to and further from the longer conjugate, in accordance with the usual convention, so that when the objective is used for projection the light passes through the objective from the rear to the front.

The present invention has for its primary object to provide an improved projection objective which will maintain the good spherical aberration correction of the known objective but will have much improved field curvature correction and considerably greater back focal length, the objective being well-corrected for oblique aberrations and for zonal spherical aberration.

The objective according to the present invention comprises a convergent front member axially spaced from a rear member, which comprises a divergent doublet component having a highly dispersive front surface and an internal contact surface convex to the front, located in front of two simple convergent components each having an equivalent focal length less than 3 F, where F is the equivalent focal length of the complete objective, whilst the axial thickness of the doublet lies between .20 F and .40 F, the materials of all the elements of the objective having mean refractive indices greater than 1.580, whilst the front focal point of the objective has between two planes respectively located .15 F in front of the front surface of the objective and .50 F behind such front surface. When employed for projection purposes, the objective is conveniently corrected with respect to a telecentric stop at or near the front focal point of the objective. The axial air separations between the components of the rear member are preferably each less than .02 F.

In one simple form of objective according to the invention the front member consists of a simple convergent component. In this case, the radius of curvature of the front surface of the divergent doublet component of the rear member preferably lies between .40 F and .60 F. The equivalent focal length of the front member conveniently lies between 1.5 F and 4.0 F, and the axial air separation between the two members may lie between .45 F and .65 F. The front focal point of the objective preferably lies within .15 F from the front surface of the front member. The mean refractive index of the material of the front element of the divergent doublet in the rear element preferably exceeds that of the rear element thereof by between .040 and .120.

Still better correction for field curvature, with a much greater field coverage, can be obtained in an alternative arrangement according to the invention wherein the front member consists of two simple components, for example a simple convergent component followed by a relatively thick meniscus component. In this case the equivalent focal length of the front member is preferably greater than 3 F, and the axial air separation between the two members conveniently lies between .23 F and .40 F. The radii of curvature of the rear surface of the front member and of the front surface of the rear member preferably each lie between .25 F and .50 F, these two surfaces being concave towards each other. The axial thickness of the rear component of the front member may lie between .17 F and .35 F, and the front focal point of the objective preferably lies within such component. The mean refractive indices of the materials of the two elements of the divergent doublet component in the rear member preferably differ from one another by less than .100. The radius of curvature of the internal contact surface in this divergent doublet preferably lies between .10 F and .60 F.

Figure 2:
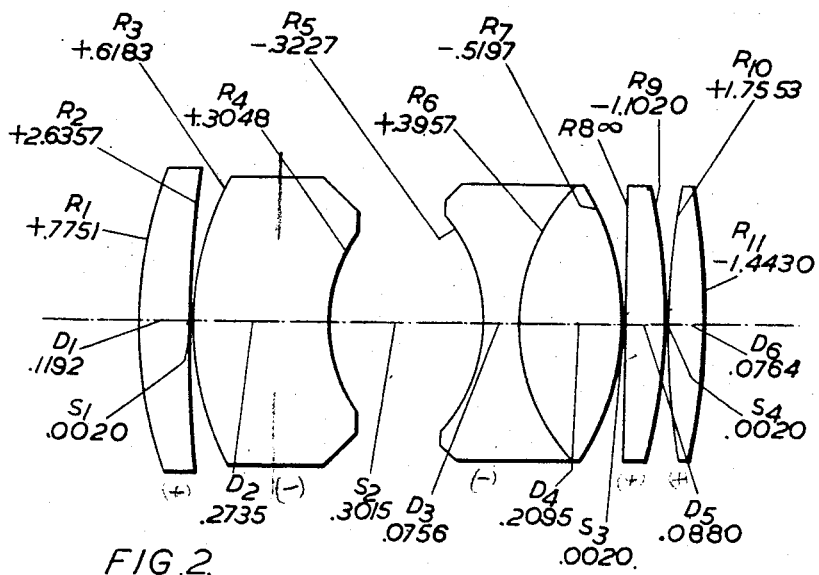

Figures 1 and 2 of the accompanying drawings respectively illustrate two convenient practical examples of objective according to the invention, both of which are intended for use in the mirror-arc system of projection and are corrected with respect to a telecentric stop at or near the front focal point.

Numerical data for these two examples are given in the following tables, in which $R_1 R_2 \ldots$ represent the radii of curvature of the individual surfaces (the positive sign indicating that the surface is convex to the front and the negative sign that it is concave thereto), $D_1 D_2 \ldots$ represent the axial thicknesses of the elements, and $S_1 S_2 \ldots$ represent the axial air separations between the components. The tables also give the mean refractive indices $n_D$ for the D-line and the Abbé V numbers of the materials used for the elements of the objective.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

*Example I*

[Equivalent focal length 1.000    Relative aperture F/1.9]

| Radius | Thickness or Air Separation | Refractive Index $n_D$ | Abbé V Number |
|---|---|---|---|
| $R_1 = +1.2388$ | | | |
| | $D_1 = .0444$ | 1.626 | 35.7 |
| $R_2 = +4.8264$ | | | |
| | $S_1 = .5924$ | | |
| $R_3 = −.5462$ | | | |
| | $D_2 = .0700$ | 1.700 | 30.3 |
| $R_4 = +.7300$ | | | |
| | $D_3 = .2586$ | 1.623 | 56.2 |
| $R_5 = −.9006$ | | | |
| | $S_2 = .0020$ | | |
| $R_6 = \infty$ | | | |
| | $D_4 = .0800$ | 1.623 | 56.2 |
| $R_7 = −1.1190$ | | | |
| | $S_3 = .0020$ | | |
| $R_8 = +1.3608$ | | | |
| | $D_5 = .0978$ | 1.623 | 56.2 |
| $R_9 = −3.5139$ | | | |

*Example II*

[Equivalent focal length 1.000    Relative aperture F/1.9]

| Radius | Thickness or Air Separation | Refractive Index $n_D$ | Abbé V Number |
|---|---|---|---|
| $R_1 = +.7751$ | | | |
| | $D_1 = .1192$ | 1.623 | 56.2 |
| $R_2 = +2.6375$ | | | |
| | $S_1 = .0020$ | | |
| $R_3 = +.6182$ | | | |
| | $D_2 = .2735$ | 1.653 | 33.5 |
| $R_4 = +.3048$ | | | |
| | $S_2 = .3016$ | | |
| $R_5 = −.3227$ | | | |
| | $D_3 = .0755$ | 1.620 | 36.2 |
| $R_6 = +.3957$ | | | |
| | $D_4 = .2095$ | 1.623 | 60.3 |
| $R_7 = −.5197$ | | | |
| | $S_3 = .0020$ | | |
| $R_8 = \infty$ | | | |
| | $D_5 = .0880$ | 1.612 | 58.5 |
| $R_9 = −1.1020$ | | | |
| | $S_4 = .0020$ | | |
| $R_{10} = +1.7553$ | | | |
| | $D_6 = .0764$ | 1.612 | 58.5 |
| $R_{11} = −1.4430$ | | | |

In the first of these examples, the front member consists of a simple convergent component having equivalent focal length 2.65 F. The objective has a telecentric stop at or near the front focal point, which is located .06 F in front of the front surface $R_1$ of the objective. The equivalent focal lengths of the convergent middle and rear components of the rear member are respectively 1.79 F and 1.55 F. The divergent front element of the divergent doublet in the rear member is made of a material having mean refractive index .077 greater than that of the material of the convergent rear element of the doublet.

This example has a long back focal length .848 F and is well-corrected for axial and oblique aberrations over a semi-angular field of 8 degrees. Axial and zonal spherical aberration is especially well-corrected and is nowhere greater than .0018 F within the aperture of the objective. Field curvature is reasonably well-corrected, the Petzval sum of the objective being .6/F, the front member alone providing about .25/F under-correct Petzval sum.

The second example may be regarded as a development of the first maintaining the good corrections thereof, but giving in addition a very high degree of correction for field curvature, the Petzval sum being reduced substantially to zero. This example covers a semi-angular field of 12 degrees, and has a back focal length of .8136 F.

This improvement is effected primarily by replacing the simple front member by two simple components, namely a simple convergent component followed by a thick meniscus component, the rear member remaining substantially as before, apart from minor dimensional changes consequent upon the alteration in the front member. The Petzval sum of the two-component front member alone is .305/F overcorrect. The equivalent focal length of the front member is 8.47 F. The equivalent focal lengths of the middle and rear components of the rear member are respectively 1.80 F and 1.29 F. The materials of the two elements of the divergent doublet in this example differ from one another only by .003. The front focal point of the objective lies within the rear component of the front member, .153 F behind the front surface $R_3$ thereof, and the stop may conveniently be located adjacent to such surface $R_3$.

What I claim as my invention and desire to secure by Letters Patent is:

1. An optical objective, corrected for spherical and chromatic aberrations, coma, astigmatism, field curvature and distortion, and comprising a convergent front member, and a rear member axially spaced therefrom, such rear member comprising a divergent doublet component having a highly dispersive front surface and an internal contact surface convex to the front, and having an axial thickness between .20 F and .40 F, where F is the equivalent focal length of the complete objective, and two simple convergent components located behind such doublet component and each having an equivalent focal length less than 3 F, the materials of all the elements of the objective having mean refractive indices greater than 1.580, whilst the front focal point of the objective lies between two planes respectively located .15 F in front of the front surface of the objective and .50 F behind such front surface.

2. An optical objective as claimed in claim 1, in which the axial air separations between the components of the rear member are each less than .02 F.

3. An optical objective as claimed in claim 2, in which the front member consists of a simple convergent component having equivalent focal length between 1.5 F and 4.0 F.

4. An optical objective as claimed in claim 3, in which the radius of curvature of the front surface of the divergent doublet in the rear member lies between .40 F and .60 F, and the mean refractive index of the material of the front element of such doublet exceeds that of the rear element thereof by between .040 and .120.

5. An optical objective as claimed in claim 4, in which the axial air separation between the two members lies between .45 F and .65 F.

6. An optical objective as claimed in claim 2, in which the front member consists of a simple convergent component, and the radius of curvature of the front surface of the divergent doublet in the rear member lies between .40 F and .60 F.

7. An optical objective as claimed in claim 2, in which the front member consists of a simple convergent component axially separated from the rear member by a distance which lies between .45 F and .65 F.

8. An optical objective as claimed in claim 2, having a telecentric stop, with respect to which the objective is corrected, adjacent to the front focal point of the objective, the front member consisting of a simple convergent component whose front surface is at an axial distance less than .15 F from such front focal point.

9. An optical objective, corrected for spherical and chromatic aberrations, coma, astigmatism, field curvature and distortion, and comprising a front member consisting of a simple convergent component, and a rear member axially spaced therefrom, such rear member comprising a divergent doublet component having a highly dispersive front surface and an internal contact surface convex to the front, and having an axial thickness between .20 F and .40 F, where F is the equivalent focal length of the complete objective, and two simple convergent components located behind such doublet component and each having an equivalent focal length less than 3 F, the materials of all the elements of the objective having mean refractive indices greater than 1.580, whilst the front focal point of the objective lies between two planes respectively located .15 F in front of the front surface of the objective and .50 F behind such front surface.

10. An optical objective as claimed in claim 9, in which the radius of curvature of the front surface of the divergent doublet in the rear member lies between .40 F and .60 F.

11. An optical objective as claimed in claim 10, in which the equivalent focal length of the front member lies between 1.5 F and 4.0 F, and the axial separation between the two members lies between .45 F and .65 F.

12. An optical objective as claimed in claim 10, having a telecentric stop, with respect to which the objective is corrected, adjacent to the front focal point of the objective, such front focal point being at an axial distance less than .15 F from the front surface of the front member.

13. An optical objective as claimed in claim 9, in which the equivalent focal length of the front member lies between 1.5 F and 4.0 F.

14. An optical objective as claimed in claim 9, in which the axial air separation between the two members lies between .45 F and .65 F.

15. An optical objective as claimed in claim 9, having a telecentric stop, with respect to which the objective is corrected, adjacent to the front focal point of the objective, such front focal point being at an axial distance less than .15 F from the front surface of the front member.

16. An optical objective, corrected for spherical and chromatic aberrations, coma, astigmatism, field curvature and distortion, and comprising a convergent front member consisting of two simple components, and a rear member axially spaced therefrom, such rear member comprising a divergent doublet component having a highly dispersive front surface and an internal contact surface convex to the front, and having an axial thickness between .20 F and .40 F, where F is the equivalent focal length of the complete objective, and two simple convergent components located behind such doublet component and each having an equivalent focal length less than 3 F, the materials of all the elements of the objective having mean refractive indices greater than 1.580, whilst the front focal point of the objective lies between two planes respectively located .15 F in front of the front surface of the objective and .50 F behind such front surface.

17. An optical objective as claimed in claim 16, in which the equivalent focal length of the front member is greater than 3 F and less than 25 F.

18. An optical objective as claimed in claim 17, in which the axial air separation between the two members lies between .23 F and .40 F, and the radii of curvature of the rear surface of the front member and the front surface of the rear member each lie between .25 F and .50 F, such two surfaces being concave towards each other.

19. An optical objective as claimed in claim 17, having a telecentric stop, with respect to which the objective is corrected, located adjacent to the front focal point of the objective, such front focal point lying within the rear component of the front member, the axial thickness of such component lying between .17 F and .35 F.

20. An optical objective as claimed in claim 16, in which the axial air separation between the two members lies between .23 F and .40 F.

21. An optical objective as claimed in claim 16, in which the radii of curvature of the rear surface of the front member and of the front surface of the rear member each lie between .25 F and .50 F, these two surfaces being concave towards each other.

22. An optical objective as claimed in claim 16, in which the axial thickness of the rear component of the front member lies between .17 F and .35 F.

23. An optical objective as claimed in claim 16, having a telecentric stop, with respect to which the objective is corrected, located adjacent to the front focal point of the objective, such front focal point lying within the rear component of the front member.

24. An optical objective as claimed in claim 16, in which the radius of curvature of the internal contact surface in the divergent doublet lies between .10 F and .60 F.

25. An optical objective, corrected for spherical and chromatic aberrations, coma, astigmatism, field curvature and distortion, and comprising a convergent front member consisting of two simple components, and a rear member axially spaced therefrom and consisting of three components axially spaced from one another by less than .02 F, where F is the equivalent focal length of the complete objective, such three components comprising a divergent doublet component having a highly dispersive front surface and an internal contact surface convex to the front, and having an axial thickness between .20 F and .40 F, and two simple convergent components located behind such doublet component and each having an equivalent focal length less than 3 F, the materials of all the elements of the objective having mean refractive indices greater than 1.580, whilst the front focal point of the objective lies between two planes respectively located .15 F in front of the front surface of the objective and .50 F behind such front surface.

26. An optical objective as claimed in claim 25, in which the axial air separation between the two members lies between .23 F and .40 F, and the equivalent focal length of the front member is greater than 3 F and less than 25 F.

27. An optical objective as claimed in claim 26, in which the radii of curvature of the rear surface of the front member and of the front surface of the rear member each lie between .25 F and .50 F, these two surfaces being concave towards each other.

28. An optical objective as claimed in claim 25, in which the axial air separation between the two members lies between .23 F and .40 F, and the axial thickness of the rear component of the front member lies between .17 F and .35 F.

29. An optical objective as claimed in claim 25, having a telecentric stop, with respect to which the objective is corected, located adjacent to the front focal point of the objective, such front focal point lying within the rear component of the front member.

30. An optical objective as claimed in claim 25, in which the radius of curvature of the internal contact surface in the divergent doublet component of the rear member lies between .10 F and .60 F, the mean refractive indices of the materials of the two elements of such component differing from one another by less than .100.

References Cited in the file of this patent

UNITED STATES PATENTS

| Number | Name | Date |
|---|---|---|
| 1,347,673 | Bishop | July 27, 1920 |
| 1,797,202 | Warmisham | Mar. 17, 1931 |
| 1,899,069 | Warmisham | Feb. 28, 1933 |
| 2,158,201 | Schade | May 16, 1939 |
| 2,158,202 | Schade | May 16, 1939 |
| 2,445,594 | Bennett | July 20, 1948 |
| 2,541,484 | Schade | Feb. 13, 1951 |

FOREIGN PATENTS

| Number | Country | Date |
|---|---|---|
| 481,484 | Germany | Aug. 31, 1929 |